US012292349B2

(12) United States Patent
Dupe et al.

(10) Patent No.: US 12,292,349 B2
(45) Date of Patent: May 6, 2025

(54) PRESSURE MEASURING RAKE COMPRISING A PATCHED LEADING EDGE, IN PARTICULAR FOR AN ENGINE OF AN AIRCRAFT, AND MORE PARTICULARLY FOR A BYPASS TURBOJET ENGINE

(71) Applicants: Airbus SAS, Blagnac (FR); Airbus Operations SAS, Toulouse (FR)

(72) Inventors: Nicolas Dupe, Toulouse (FR); Nicolas Jean, Toulouse (FR); Cyrille Dajean, Toulouse (FR); Christian Meloni, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 18/442,180

(22) Filed: Feb. 15, 2024

(65) Prior Publication Data

US 2024/0280428 A1   Aug. 22, 2024

(30) Foreign Application Priority Data

Feb. 17, 2023   (FR) ..................................... 2301496

(51) Int. Cl.
*F01D 9/00*   (2006.01)
*F01D 17/08*   (2006.01)
(Continued)

(52) U.S. Cl.
CPC .............. *G01L 19/147* (2013.01); *F01D 9/00* (2013.01); *F01D 17/08* (2013.01); *F02K 1/625* (2013.01); *F05D 2260/80* (2013.01)

(58) Field of Classification Search
CPC ......... G01L 19/147; F01D 9/00; F01D 17/08; F02K 1/625; F05D 2260/80
See application file for complete search history.

(56) References Cited

U.S. PATENT DOCUMENTS 4,433,584 A * 2/1984 Kokoszka ........... G01L 19/0007
                                                    73/861.66
4,605,315 A * 8/1986 Kokoszka ............. F01D 21/003
                                                    374/138
(Continued)

FOREIGN PATENT DOCUMENTS

EP   3671166 A1   6/2020
FR   3065806 A1   11/2018
(Continued)

OTHER PUBLICATIONS

French Search Report and Written Opinion for corresponding French Patent Application No. 2301496 dated Aug. 25, 2023.

*Primary Examiner* — Elton K Wong
*Assistant Examiner* — Theodore C Ribadeneyra
(74) *Attorney, Agent, or Firm* — Greer, Burns & Crain, Ltd.

(57) ABSTRACT

A measuring rake, configured to be arranged on a link rod, includes a sheath including a front face and two side walls delimiting between them a recess configured to receive the link rod, an electronic circuit arranged on the front face of the sheath and including at least one sensor, a patched leading edge fixed removably to the sheath, and a seal arranged between the patched leading edge and the electronic circuit, the patched leading edge including a plurality of air intakes, each forming a fluidic passage between an outer face and an inner face of the patched leading edge opening out facing at least one sensor of the electronic circuit, the measuring rake making it possible to obtain a measuring tool which can be assembled simply and quickly, with easy access to the electronic circuit, and making it possible to avoid problems of orifice blockages or air leaks.

11 Claims, 4 Drawing Sheets

(51) Int. Cl.
   *F02K 1/62*      (2006.01)
   *G01L 19/14*     (2006.01)

(56)           References Cited

U.S. PATENT DOCUMENTS 10,598,041 B2 *  3/2020  Rice ..................... F01D 17/08
   10,907,507 B2 *  2/2021  Giordan ................ G01M 15/14
   2017/0138216 A1 * 5/2017  Giordan ................ G01M 15/14
   2019/0323909 A1  10/2019  Burgan
   2020/0191676 A1   6/2020  Caturla et al.

FOREIGN PATENT DOCUMENTS

FR          3079613      * 10/2019   ............ F01D 9/065
   FR          3079613 A1    10/2019
   FR          3090102 A1     6/2020

* cited by examiner

PRESSURE MEASURING RAKE COMPRISING A PATCHED LEADING EDGE, IN PARTICULAR FOR AN ENGINE OF AN AIRCRAFT, AND MORE PARTICULARLY FOR A BYPASS TURBOJET ENGINE

CROSS-REFERENCES TO RELATED APPLICATIONS

This application claims the benefit of the French patent application No. 2301496 filed on Feb. 17, 2023, the entire disclosures of which are incorporated herein by way of reference.

FIELD OF THE INVENTION

The present invention relates to a pressure measuring rake, in particular for an engine of an aircraft, and more particularly for a bypass turbojet engine.

BACKGROUND OF THE INVENTION

During some design or maintenance phases for an aircraft, the engines of the aircraft, notably the turbojet engines, are likely to be tested. These tests require measurements to be taken, on the ground and/or in flight, at various locations of the engine that are to be tested. This taking of measurements involves instrumentation of the engine, in particular inside a secondary duct. Measuring tools intended for installation in an engine to be tested, notably for measuring pressures, are known for this.

However, it is often only possible to assemble and install these measuring tools with difficulty and over a lengthy period of time, this possibly making the test phases laborious and expensive.

Document FR 3 090 102 A1 discloses a measuring tool for taking pressure measurements in an aircraft engine. However, the measuring tool disclosed has a non-optimum design. This is because it is intended to be assembled by adhesive bonding, which prevents dismounting, for example in order to replace or reposition components. Moreover, the injection of adhesive or resin is difficult to control, notably in terms of dosage. Too much can block cavities, whereas too little is liable to create leaks, and these events can then hinder the taking of measurements.

The existing measuring tools are therefore not entirely satisfactory.

SUMMARY OF THE INVENTION

An aim of the present invention is to rectify the above-mentioned drawbacks. It relates to a pressure measuring rake, in particular for an engine of an aircraft, and more particularly for a bypass turbojet engine.

According to the invention, the measuring rake, which is intended for arrangement on a link rod, comprises at least:
- a sheath comprising a front face and two side walls which between them delimit a recess intended for receiving the link rod;
- an electronic circuit arranged on the front face of the sheath and comprising at least one sensor; and
- a patched leading edge fixed removably to the sheath, the patched leading edge comprising an inner face arranged on the front face of the sheath so as to cover the electronic circuit, an outer face situated opposite the inner face, and a plurality of air intakes distributed over a length of the patched leading edge, each of the air intakes forming a fluidic passage between the outer face and the inner face of the patched leading edge opening out onto the electronic circuit via the inner face, facing at least one sensor of the electronic circuit.

As a result, the measuring rake provides a measuring tool which can be assembled particularly simply and quickly, the removable patched leading edge making it possible notably to be able to easily access the electronic circuit, for example to change or repair a defective sensor, and also making it possible to avoid assembly by adhesive bonding and therefore the associated problems, for example orifice blockages or air leaks.

The measuring rake preferably additionally comprises at least one seal arranged removably between the inner face of the patched leading edge and the front face of the sheath, the seal being pressed against the electronic circuit at least partially covering it.

Advantageously, the seal has at least one through-opening facing at least one sensor of the electronic circuit, each of the openings forming, between the electronic circuit and the inner face of the patched leading edge, a cavity hermetically isolated from another cavity, each cavity comprising at least one sensor, each air intake of the patched leading edge communicating exclusively with one cavity.

Furthermore, in a preferred embodiment, the patched leading edge comprises at least one measurement fitting arranged on the outer face of the patched leading edge in the continuation of each air intake, each measurement fitting having a cylindrical shape able to channel a flow of air incident on the outer face into its respective air intake.

Advantageously, the patched leading edge comprises, on the outer face, at least one tapped hole by way of which at least one air intake opens out, each measurement fitting corresponding to a fitted part screwed in a tapped hole.

The measuring rake moreover comprises at least one fixing element for fixing the patched leading edge to the sheath.

In a particular embodiment, the measuring rake additionally comprises at least one counter-plate arranged on a rear face of the sheath situated opposite the front face, the counter-plate being provided, over its length, with a plurality of through-holes for the passage of the fixing elements from the inside of the sheath, the fixing elements passing through at least the counter-plate, the sheath, the seal and the electronic circuit to reach the patched leading edge so as to fix the patched leading edge to the sheath.

Moreover, the measuring rake comprises at least one data processing unit able to receive data measured by the sensors of the electronic circuit, the data processing unit being integrated in the sheath or separate.

The invention also relates to an engine for an aircraft. According to the invention, the engine comprises a secondary duct and at least one movable reverser door; the reverser door comprising at least one link rod fixed in articulated fashion between the reverser door and a motor; the link rod being configured to make it possible to bring the reverser door into a retracted position, in which it is not across the secondary duct, and into a deployed position, in which it is across the secondary duct, the engine comprising at least one measuring rake as described above arranged on at least one link rod of the engine; the one or more link rods each being accommodated in the recess of at least one measuring rake.

The invention also relates to an aircraft comprising at least one engine as described above.

BRIEF DESCRIPTION OF THE DRAWINGS

The appended figures will make it easy to understand how the invention may be implemented. In these figures, identical reference signs designate similar elements.

DETAILED DESCRIPTION OF THE PREFERRED EMBODIMENTS

Figure 1:
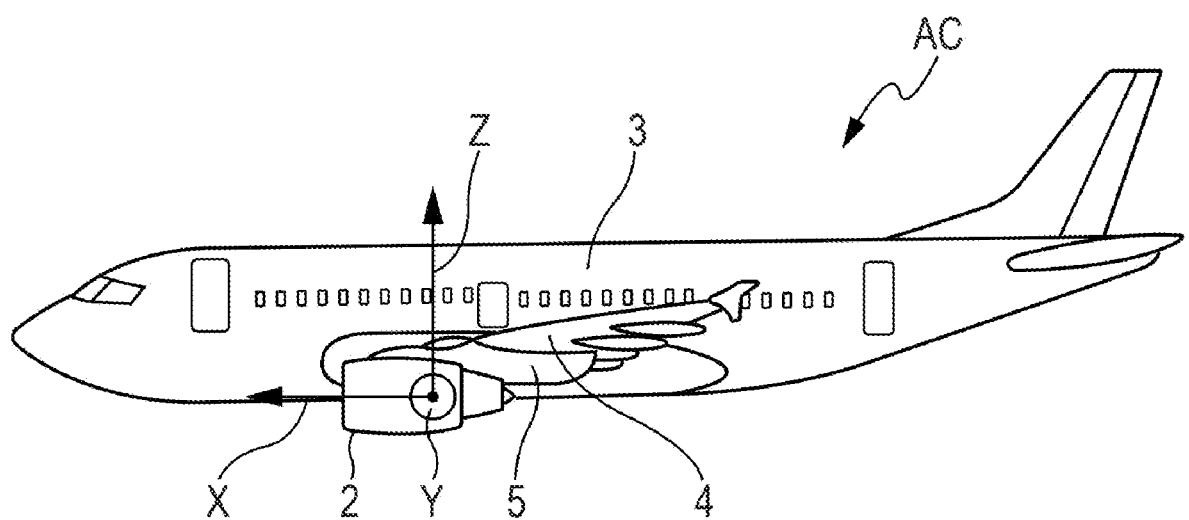
FIG. 1 is a side view of an aircraft according to the invention.

The pressure measuring rake 1 (hereinafter measuring rake 1), which makes it possible to illustrate the invention, is shown in particular embodiments in FIG. 2 to FIG. 6. It corresponds to a measuring tool for taking aerodynamic measurements, notably pressure measurements. The measuring rake 1 is particularly, but not exclusively, suitable for use on an aircraft AC, shown in FIG. 1. The measuring rake 1 makes it possible to take measurements within the scope of tests on the ground and/or in flight. The measuring rake 1 is preferably arranged in a duct of an engine 2 of the aircraft AC, as shown in FIG. 2 and FIG. 3.

The aircraft AC comprises a fuselage 3, on each side of which is fixed a wing 4 bearing an engine 2 fixed to a pylon 5 located underneath the wing 4. In the preferred embodiment described in the present description, the engine 2 corresponds to a bypass turbojet engine and the measuring rake 1 is configured to take pressure measurements in a secondary duct 6 of the engine 2. However, the invention is not restricted to such an engine and the measuring rake 1 may be used in a wide variety of different situations in which the pressure of a flow of air must be measured.

In the following text, reference will be made to an orthogonal reference system (X, Y, Z) such that:
X is the longitudinal axis of the engine 2, which is parallel to the longitudinal axis of the aircraft AC and oriented positively towards the front of the aircraft AC;
Y is the axis transverse to the engine and perpendicular to the axis X; and
Z is the axis perpendicular to the axis X and the axis Y.

Figure 2:
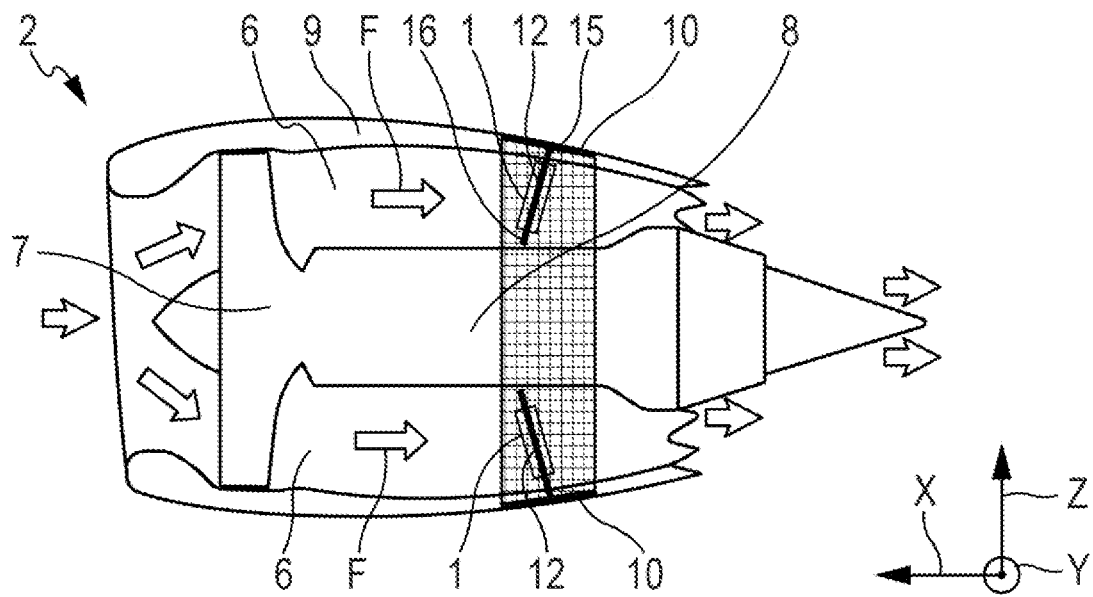
FIG. 2 is a side view, in section, of an engine according to the invention comprising reverser doors in a retracted position.
Figure 3:
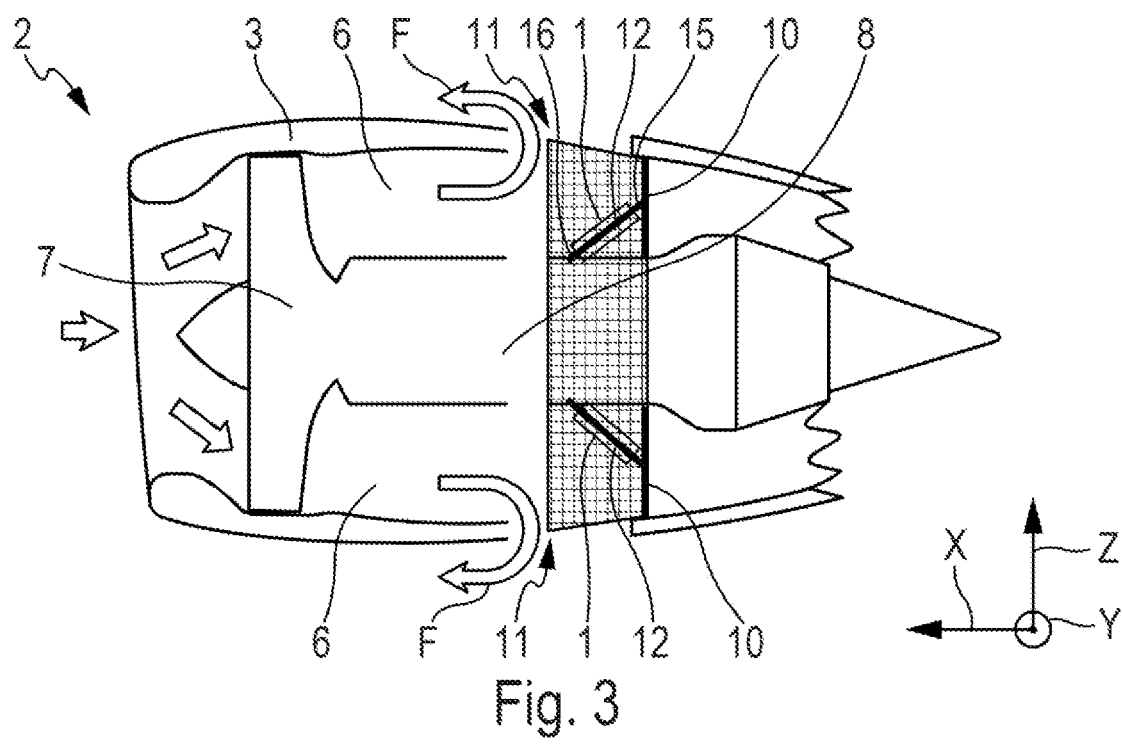
FIG. 3 is a side view, in section, of an engine according to the invention comprising reverser doors in a deployed position.

As shown in FIG. 2 and FIG. 3, the engine 2 comprises a fan 7, a motor 8 forming a core, and a nacelle 9 disposed around the motor 8. The secondary duct 6 is delimited between the motor 8 and the nacelle 9. The air enters through the fan 7 and then is divided into a primary flow which passes through the motor 8 and a secondary flow which passes through the secondary duct 6, as shown by arrows F in FIG. 2 and FIG. 3.

The engine 2 also comprises a thrust reversal system which comprises reverser doors 10. These reverser doors 10 are mounted rotatably about an axis substantially perpendicular to the axis X, that is parallel to the axis Y. They may be brought into a retracted position (FIG. 2), corresponding to a configuration in which the engine 2 is in thrust mode, and into a deployed position (FIG. 3), corresponding to a configuration in which the engine 2 is in counter-thrust mode. In the retracted position, the reverser doors 10 are comprised in the walls of the nacelle 9, they are not across the secondary duct 6, and they therefore do not obstruct the passage of the secondary flow of air. In the deployed position, the reverser doors 10 extend from the motor 8 to the walls of the nacelle 9, they are across the secondary duct 6, and they therefore obstruct the passage of the secondary flow of air. In addition, in this deployed position, the reverser doors 10 open windows 11 which communicate with the outside of the nacelle 9 and allow the secondary flow of air to be deflected through the windows 11.

Moreover, the engine 2 comprises a link rod 12 arranged on each reverser door 10. Each link rod 12 comprises a body 14 (FIG. 6) provided with an elongate shape extending between the motor 8 and the reverser door 10 on which it is arranged. In addition, a longitudinal end 15 of each link rod 12 is fixed in articulated fashion to the reverser door 10 and another longitudinal end 16 of each link rod 12 is fixed in articulated fashion to the motor 8. In addition, the body 14 of each link rod 12 has an aerodynamic cross section around which the secondary flow of air of the secondary duct 6 flows.

The engine 2 also comprises conventional displacement elements (rams, slides, etc.) for bringing the reverser doors 10 into the retracted position and into the deployed position via the link rods 12.

In the deployed position, the link rods 12 are across the secondary duct 6, that is they are oriented such that their longitudinal direction is substantially incident on the secondary flow of air. Conversely, in the retracted position, the link rods 12 are not across the secondary duct 6, that is they are oriented such that their longitudinal direction is substantially in the direction of the secondary flow of air.

In the preferred embodiment, shown in FIG. 2 to FIG. 6, the measuring rake 1 is configured to make it possible to take measurements of the pressure of the secondary flow of air in the secondary duct 6, in particular when the reverser door 10 is in the retracted position. In this embodiment, the measuring rake 1 is arranged on a link rod 12 of the engine 2, but in other embodiments it may be configured for arrangement on another element of the engine 2 or the aircraft AC.

Figure 4:
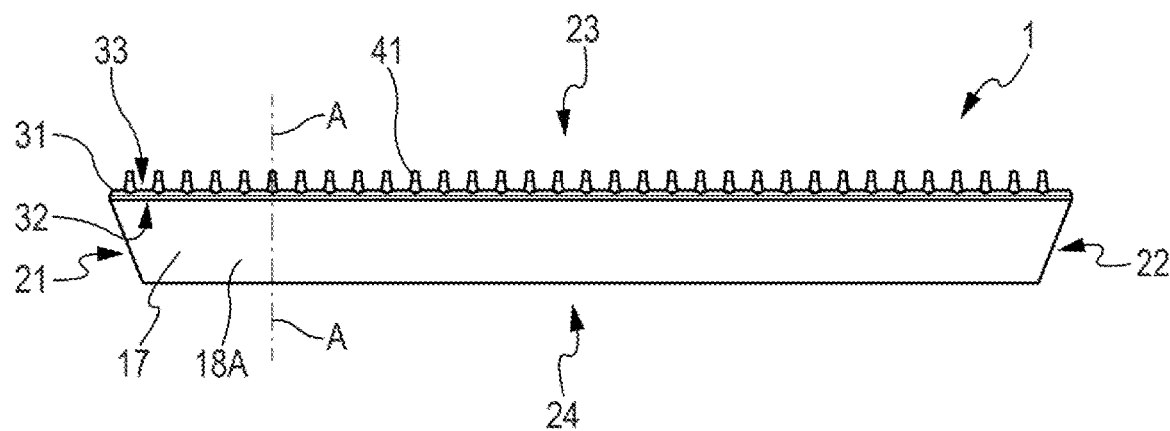
FIG. 4 is a side view of a measuring rake according to a particular embodiment of the invention.
Figure 5:
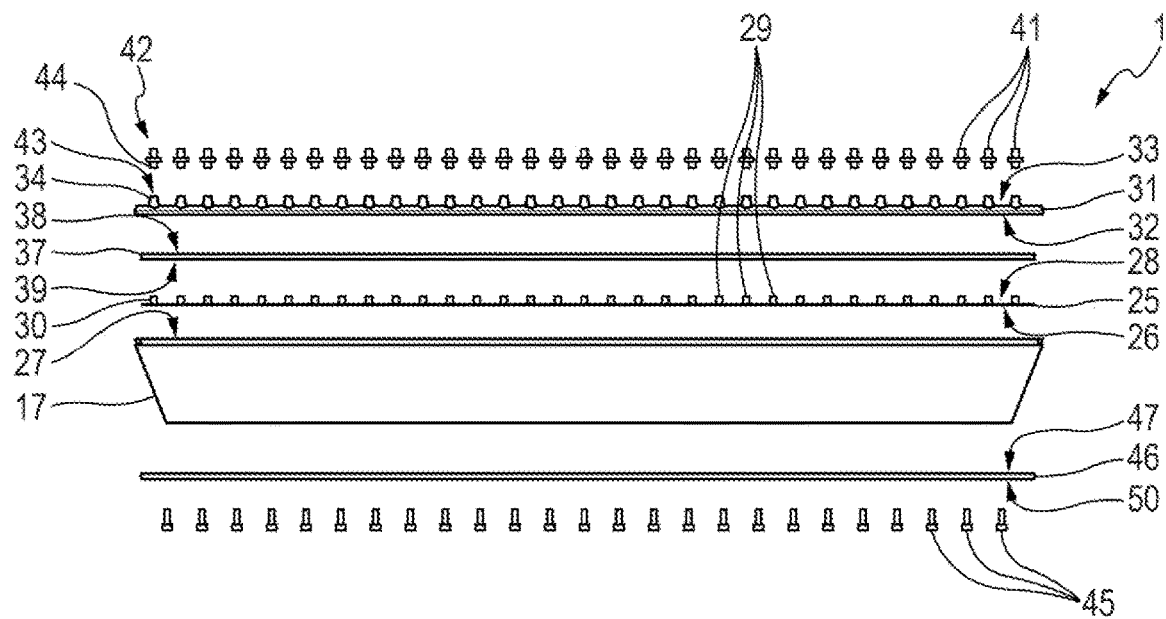
FIG. 5 is an exploded view of the measuring rake of FIG. 4.
Figure 6:
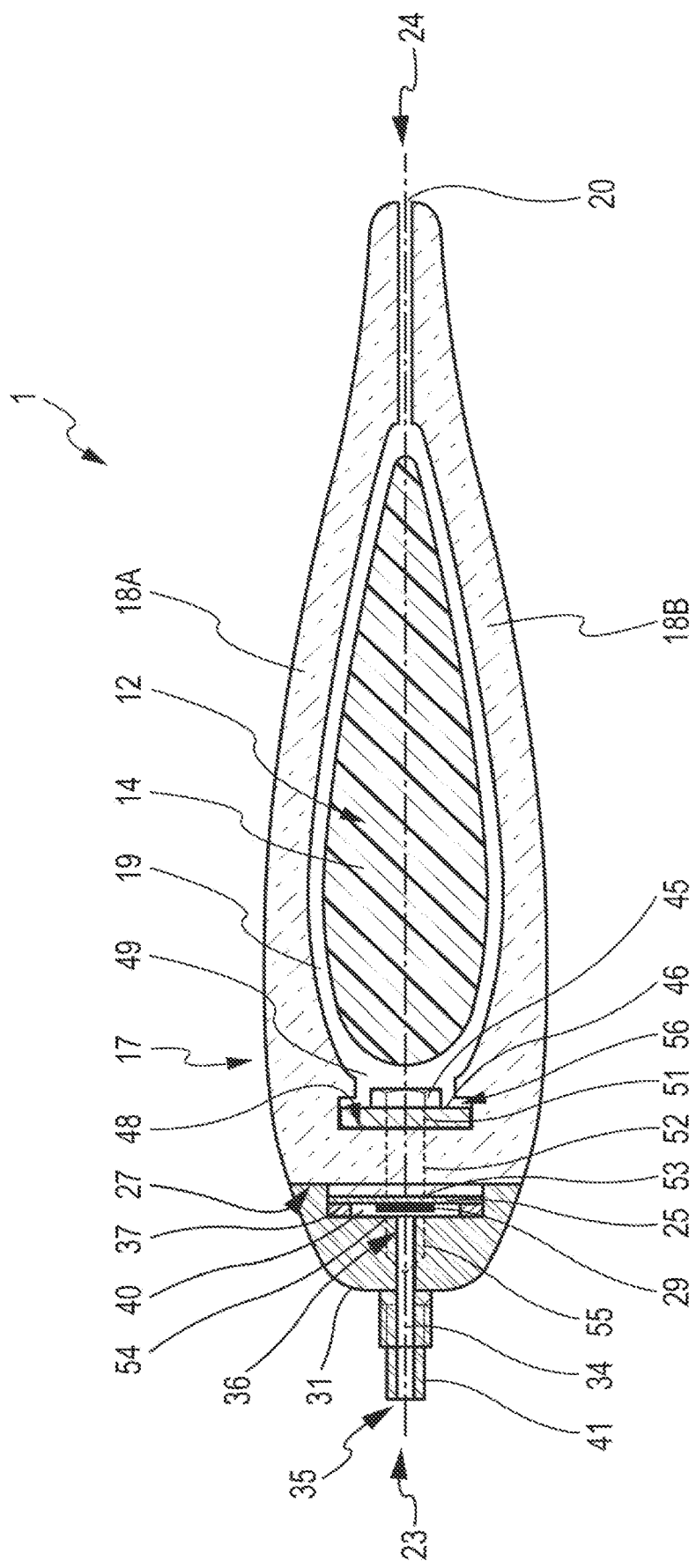
FIG. 6 is a sectional view through a sectional plane A-A of the measuring rake of FIG. 4.

The measuring rake 1, shown in FIG. 4 to FIG. 6, is a measuring tool comprising various removable elements which can be mounted and dismounted. Specifically, "removable" element is understood to mean an element which is fixed to an assembly such that it can be separated from the assembly and remounted afterwards, as desired and without damaging the assembly. As illustrated in the exploded view of FIG. 5, the measuring rake 1 is configured such that the various elements composing it are assembled and fixed together "in sandwiched fashion". This assembly is described in more detail in the rest of the description.

The measuring rake 1 notably comprises a sheath 17 which is disposed and fixed on the body 14 of the link rod 12 that is to be instrumented. This sheath 17 has an elongate shape and an aerodynamic profile, for example a biconvex profile. The sheath 17 is preferably made by three-dimensional printing from a polymer-type material, for example polyamide.

The measuring rake 1 has a length that is able to at least partially cover all of the link rod 12. Non-limitingly, in the example in question of application to an aircraft engine, the measuring rake 1 typically has a length of between 50 cm and 1 m, in particular a length of 80 cm.

As shown in a sectional view in FIG. 6, the sheath 17 comprises two side walls 18A and 18B which between them delimit a recess 19 configured to receive the body 14 of the link rod 12. In addition, the recess 19 communicates with the outside of the sheath 17 by way of a slot 20 that extends over the length of the sheath 17 between the side walls 18A and 18B. They thus form a clamp for tightly surrounding the body 14 of the link rod 12. Moreover, the sheath 17 is open at longitudinal ends 21 and 22, this allowing the longitudinal ends 15 and 16 of the link rod 12 to project beyond the sheath 17 in order to be fixed to the motor 8 and the reverser door 10, respectively.

The slot 20 is narrower than the thickness of the body 14 of the link rod 12 and the introduction of the link rod 12 therefore requires elastic spreading of the side walls 18A and 18B in order to install the measuring rake 1 on the link rod 12. Elastic retightening of the side walls 18A and 18B over the body 14 of the link rod 12, when the latter is in the recess 19, makes it possible to hold the measuring rake 1 in place without needing to provide additional elements. The body 14 may, however, have shapes or elements (not shown) to make it easier to position the measuring rake 1 and/or to prevent the movement of the sheath 17 along the link rod 12.

In a particular embodiment, the side walls 18A and 18B may be held mutually tightly against the body 14 of the link rod 12 via a removable fixing means (not shown). For example, they may be screwed, bolted, adhesively bonded or clamped by a clamping collar.

When it is in place on the link rod 12 in the secondary duct 6, the sheath 17 has, with respect to the flow of air in the secondary duct 6, a leading edge 23 oriented towards the front (positively along the axis X) and a trailing edge 24 oriented towards the rear (negatively along the axis X). The sheath 17 is preferably configured such that the slot 20 is located at the trailing edge 24.

Furthermore, as illustrated in FIG. 5 and FIG. 6, the measuring rake 1 comprises an electronic circuit 25 arranged removably on the sheath 17. This electronic circuit 25 is notably provided with a face 26 arranged on a front face 27 of the sheath 17. The front face 27 corresponds to a surface located on the side of the leading edge 23 which extends over the length of the sheath 17. The electronic circuit 25 is also provided with a face 28, situated opposite the face 26 and thus oriented towards the leading edge 23, on which a plurality of pressure sensors 29 are arranged.

The electronic circuit 25 preferably corresponds to a printed circuit having an elongate shape and it is arranged over the entire length of the front face 27. However, in particular embodiments, it may be another type of electronic circuit extending over all or some of the front face 27. In addition, the sensors 29 are distributed so as to form a line extending over the length of the electronic circuit 25.

The electronic circuit 25 also comprises a data bus for incoming and/or outgoing data communications with the sensors 29, and an electrical power supply. In the preferred embodiment of the present description, the sensors 29 are configured to measure pressure values generated by the secondary flow of air in the secondary duct 6, as specified later on in the description.

The sensors 29 preferably correspond to pressure sensors of the microelectromechanical system type (also referred to as MEMS). However, they may be sensors of another type that can take pressure measurements. By way of non-limiting example, the "MEMS" sensors, which are particularly compact, make it possible to obtain a line of sensors 29 along the electronic circuit 25 with a density of fifty sensors per meter, this representing a sensor every 20 mm. Depending on the applications and/or the measurement precision to be obtained, the density of sensors may vary, for example with a distance between two sensors 29 of between 10 mm and 100 mm.

Moreover, the measuring rake 1 has a data processing unit 30, which is shown schematically in FIG. 5. The data processing unit 30 is connected to the electronic circuit 25 so as to be able to receive data measured by the sensors 29 of the electronic circuit 25. Non-limitingly, the data processing unit 30 may be configured to perform a function of acquiring and transmitting data measured by the sensors 29 and/or a storing function, for example in a memory (not shown). In a particular embodiment, the data processing unit 30 is integrated directly on the measuring rake 1, for example in part of the sheath 17. In other embodiments, the data processing unit 30 may be separate and elsewhere. For example, it may be arranged on part of the engine 2, on or under the reverser door 10.

In one embodiment or these embodiments, the measuring rake 1 may comprise a base (not shown in the figures) arranged at one end of the sheath 17. The base has a flat shape. The base is configured to protect the data processing unit 30 if the latter is arranged on the measuring rake 1. The base is able to be pressed against the reverser door 10 so as to cover the data processing unit 30 to protect it from the surrounding area.

As shown in FIG. 4 to FIG. 6, the measuring rake 1 also comprises a patched leading edge 31 fixed to the front face 27 of the sheath 17. It is a removable one-piece part which covers all of the front face 27. It may be made from a metal material, preferably aluminum, by machining.

The patched leading edge 31 comprises an inner face 32 arranged on the front face 27 of the sheath 17 so as to cover the electronic circuit 25. It also comprises an outer face 33 situated opposite the inner face 32. As illustrated in FIG. 5, the outer face 33 is located towards the leading edge 23 of the sheath 17 and has a rounded shape intended to be incident on the secondary flow of air.

The leading edge 31 additionally comprises a plurality of air intakes 34 distributed over the length of the patched leading edge 31. In the example illustrated in FIG. 4 and FIG. 5, the air intakes 34 are distributed at regular intervals, that is, at the same distance from one another. However, they may also be distributed at irregular intervals. Each air intake 34 forms a fluidic passage between the outer face 33 and the inner face 32. These air intakes 34 have an end 35 which opens out into the secondary duct 6 by way of the outer face 33 and an end 36 which opens out onto the electronic circuit 25 by way of the inner face 32. In particular, each air intake 34 opens out by way of the end 36 facing a sensor 29 of the electronic circuit 25.

The patched leading edge 31 configured in this way allows each sensor 29 to measure a pressure of a flow of air in the secondary duct 6 channeled by a particular air intake 34. However, in particular embodiments, each air intake 34 may open out facing a plurality of sensors 29 so as to take multiple measurements linked to a flow of air channeled by an air intake 34.

As a result, the measuring rake 1 provides a pressure measuring tool which can be assembled particularly simply and quickly. The removable patched leading edge 31 notably makes it possible to be able to easily access the electronic circuit 25, for example to change or repair a defective sensor 29. Moreover, the measuring rake 1 has a configuration which makes it possible to avoid assembly by adhesive bonding and thus the associated problems, for example orifice blockages or air leaks.

Furthermore, as shown in FIG. 4 to FIG. 6, the measuring rake 1 comprises a seal 37 arranged removably between the patched leading edge 31 and the sheath 17. More particularly, the seal 37 comprises a face 38 arranged against the inner face 32 of the patched leading edge 31 and a face 39 arranged against the face 28 of the electronic circuit 25. The patched leading edge 31 is fixed to the sheath 17 so as to press the seal 37 against the face 28 of the electronic circuit 25. In addition, the seal 37 has an elongate rectangular shape similar to that of the electronic circuit 25 on which it rests. The seal 37 preferably has the same width as the electronic circuit 25 so as to cover all the face 28. For example, the seal 37 has a width of approximately 6 mm.

The shape of the seal 37 ensures leaktightness at the interface between the inner face 32 and the front face 27 that makes it possible to isolate the sensors 29 from the surrounding area, that is, from the secondary duct 6 in which the measuring rake 1 is installed. Although the seal 37 produces leaktightness at the interface between the inner face 32 and the front face 27, it still enables fluidic communication between the surrounding area and the sensors 29 through the air intakes 34. This fluidic communication allows the incident flow of air in the secondary duct 6 to enter the air intakes 34 such that the sensors 29 can measure pressure values of the flow of air.

The seal 37 corresponds to a flat seal made from a conventional leaktight material and preferably is a silicone seal.

In particular embodiments, the measuring rake 1 may comprise a plurality of seals 37 covering all or some of the electronic circuit 25.

Moreover, as shown in FIG. 6, the seal 37 comprises a plurality of openings 40 distributed over its length. The openings 40 extend transversely between the faces 38 and 39 of the seal 37. Each opening 40 is made facing each sensor 29 of the electronic circuit 25, thus forming cavities each comprising the sensors 29. These cavities are closed on one side by the inner face 32 of the patched leading edge 31 and on the other side by the face 28 of the electronic circuit 25. The openings 40 then form cavities which are hermetically isolated from one another.

In addition, each air intake 34 of the patched leading edge 31 opens out into one of the cavities formed by the openings 40. In this way, each sensor 29 is located in a hermetic cavity which communicates with the outside via one of the air intakes 34.

Non-limitingly, the openings 40 may have a rectangular cross section, for example a cross section of 6 mm by 4 mm. The openings 40 are preferably made by laser cutting.

The seal 37 configured in this way makes it possible to obtain accurate pressure measurements by reducing the risk of leaks or any blockage of the air intakes 34. It notably makes it possible to obtain pressure measurements for each sensor 29 which are perfectly independent of one another.

Moreover, as shown in FIG. 4 to FIG. 6, the measuring rake 1 comprises measurement fittings 41 arranged on the outer face 33 of the patched leading edge 31. Each measurement fitting 41 is located in the continuation of an air intake 34. They have a hollow cylindrical shape, projecting towards the leading edge 23, and they are provided with an end 42 through which the incident flow of air in the secondary duct 6 enters. Each measurement fitting 41 is configured to channel the flow of air in the secondary duct 6 into an air intake 34.

The measurement fittings 41 correspond to conventional fittings of the pitot tube type. They are preferably fittings of the Kiel probe type which are suitable for taking total pressure measurements. In particular, the fittings of the Kiel probe type make it possible to obtain accurate measurements to within 1% for yaw and/or pitch angles of the measurement fitting 41 up to 64° (in relation to the direction of the flow of air).

Furthermore, the measurement fittings 41 are made of metal material. They are preferably made from stainless steel by three-dimensional printing.

In a particular embodiment, shown in FIG. 4 to FIG. 6, the measurement fittings 41 correspond to fitted parts which are removably fixed to the patched leading edge 31. To do this, the patched leading edge 31 is provided with tapped holes 43 over its outer face 33. They are located on the outer face 33 such that an air intake 34 opens out into each of them. In addition, the measurement fittings 41 each have a threaded end 44, situated opposite the end 42, which is configured to be screwed in the tapped holes 43.

As a result, it is possible to easily change the measurement fittings 41, for example to replace a defective fitting or to modify the type of fitting used to take measurements.

Furthermore, a flat seal (not shown) may be arranged between the measurement fitting 41 and the patched leading edge 31 to ensure leaktightness. In addition or alternatively, an adhesive of the "thread lock" type may be applied to the threaded end 44 in order to improve the fixing and/or leaktightness.

In addition, the measuring rake 1 comprises fixing elements able to removably fix the leading edge 31 to the sheath 17. Non-limitingly, these fixing elements may correspond to screws, bolts or rivets.

In the preferred embodiment, shown in FIG. 4 to FIG. 6, the measuring rake 1 comprises a plurality of screws 45 and a counter-plate 46 for removably fixing the sheath 17, the electronic circuit 25, the seal 37 and the leading edge 31 to one another, as specified above.

The counter-plate 46 corresponds to an elongate rigid plate able to act as a fixing support for the assembly of the measuring rake 1. It is arranged inside the sheath 17, in the recess 19. As shown in FIG. 6, the counter-plate 46 is preferably slid in a T-shaped groove 56, this holding it mechanically in place in the sheath 17 and allowing access for inserting the screws 45. More specifically, the counter-plate 46 has a face 47 arranged against a rear face 48 of the sheath 17. The rear face 48 is located in a bay 49 in the bottom of the recess 19 parallel to the front face 27. The counter-plate 46 also has a face 50 acting as bearing face for the heads of the screws 45.

Moreover, as shown in FIG. 6, holes that enable the passage of the screws 45 are made all the way through the counter-plate 46, the sheath 17, the electronic circuit 25 and the seal 37. The counter-plate 46 comprises through-holes 51 made between its faces 47 and 50. The sheath 17 comprises holes 52 made between its front face 27 and its rear face 48. The electronic circuit 25 comprises holes 53 made between its faces 26 and 28. The seal comprises holes 54 made between its faces 38 and 39.

Moreover, the patched leading edge 31 comprises fixing holes 55 made in its inner face 32. These fixing holes 55 correspond to tapped holes which are blind at one end and open out at the other end by way of the inner face 32.

The counter-plate 46, the electronic circuit 25, the seal 37 and the patched leading edge 31 are arranged on the sheath 17 such that the through-holes 51, the holes 52, 53, 54 and the fixing holes 55 are aligned with one another. The sheath 17 may have shapes suitable for producing or facilitating this alignment. The screws 45 are arranged through the holes 51, 52, 53, 54 and 55 and aligned such that their heads bear against the face 47 of the counter-plate 46 and they are screwed in the fixing holes 55 of the patched leading edge 31.

The measuring rake 1 mounted in this way, as shown in FIG. 6, has a sandwiched assembly held in position by the screws 45. Such an assembly makes it possible to perform multiple functions:

- it makes it possible to fix the patched leading edge 31 to the sheath 17;
- it makes it possible to position the sandwiched elements with respect to one another by virtue of the alignment realized via the screws 45; and
- it makes it possible to clamp the sandwiched elements together, notably the seal 37, such that it can ensure leaktightness.

In a preferred application, the measuring rake 1 as described above can be assembled and used as follows. The electronic circuit 25 is placed on the front face 27 of the sheath 17. The seal 37 is disposed on top of the electronic circuit 25 so as to position each sensor 29 of the electronic circuit 25 in one of the cavities formed by the openings 40. In parallel, the counter-plate 46 is arranged against the rear face 48 of the sheath 17 by being slid into the bay 49 by way of one of the ends 15 and 16 of the body 14 of the sheath 17. The screws 45 are inserted into the through-holes 51 in the counter-plate 46 from the recess 19 in the sheath 17. Then, the positions of the counter-plate 46, the electronic circuit 25 and the seal 37 are adjusted such that the holes 51, 52, 53 and 54 align to allow the screws 45 to pass through. The patched leading edge 31 is then brought onto the front face 27 of the sheath 17, on top of the electronic circuit 25 and the seal 37. Lastly, the screws 45 are screwed in the fixing holes 55 in the patched leading edge 31 by bringing a screwing tool into the recess 19. The screws 45 thus exert a force on the patched leading edge 31 that presses it against the front face 27 of the sheath 17. The electronic circuit 25, the seal 37 and the sheath 17 are then sandwiched tightly between the counter-plate 46 and the patched leading edge 31.

Once the measuring rake 1 has been assembled, leaktightness tests can be carried out to check the correct positioning of the seal 37 and that there are no leaks. Although this assembly considerably limits the risk of a leak, if such a leak were to be identified during the leaktightness tests the seal 37 can be repositioned by simply dismounting the patched leading edge 31.

The measuring rake 1 assembled and tested in this way is able to be positioned on a link rod 12 of the engine 2 in which measurements are to be taken. Specifically, such an assembly without adhesive bonding does not require waiting for the adhesive to dry to carry out leaktightness tests and to mount the measuring rake 1 on the link rod 12.

If a fault linked to the electronic circuit 25 is detected (or simply suspected), the measuring rake 1 is removed from the link rod 12 on which it is installed. It is then dismounted by unscrewing the screws 45, this making it possible to remove the patched leading edge 31 and the seal 37 to access the electronic circuit 25. The one or more defective sensors 29 can then be identified and replaced, if appropriate. Once this operation has been completed, the measuring rake 1 is remounted as described above and can be reused.

The measuring rake 1 as described above has numerous advantages. In particular:

- it has a simple and inexpensive design for rapid assembly;
- it makes it possible to avoid assembly by adhesive bonding and thus all the inherent problems, specifically passage blockages and/or leaks, that can impact the measurements;
- it is assembled dismountably, making it easier to access the electronic circuit 25; and
- it makes it possible to replace particular elements of the measuring rake without needing to replace the measuring rake 1 entirely, notably to replace one or more defective sensors 29.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A measuring rake configured to be arranged on a link rod, comprising:
    a sheath comprising a front face and two side walls which between them delimit a recess intended for receiving the link rod;
    an electronic circuit arranged on the front face of the sheath and comprising at least one sensor; and
    a patched leading edge fixed removably to the sheath, said patched leading edge comprising an inner face arranged on the front face of the sheath so as to cover the electronic circuit, an outer face situated opposite said inner face, and a plurality of air intakes distributed over a length of the patched leading edge, each of said air intakes forming a fluidic passage between the outer face and the inner face of the patched leading edge opening out onto the electronic circuit via said inner face, facing at least one sensor of the electronic circuit; and
    at least one measurement fitting arranged removably on the outer face of the patched leading edge in a continuation of each air intake, the at least one measurement fitting being threaded to screw into a corresponding receiver on the outer face of the patched leading edge.

2. The measuring rake according to claim 1, further comprising at least one seal arranged removably between the inner face of the patched leading edge and the front face of the sheath, said seal being pressed against the electronic circuit at least partially covering the electronic circuit.

3. The measuring rake according to claim 2, wherein the seal has at least one through-opening facing at least one sensor of the electronic circuit, each of said through-openings forming, between the electronic circuit and the inner face of the patched leading edge, a cavity hermetically isolated from another cavity, each cavity comprising at least one sensor, each air intake of the patched leading edge communicating exclusively with one cavity.

4. The measuring rake according to claim 1, wherein each measurement fitting has a cylindrical shape able to channel a flow of air incident on said outer face into its respective air intake.

5. The measuring rake according to claim 4, wherein the patched leading edge comprises, on the outer face, at least one tapped hole by way of which at least one air intake opens out, wherein the least one measurement fitting is arranged to be screwed in a into the at least one tapped hole.

6. The measuring rake according to claim 1, further comprising at least one fixing element for fixing the patched leading edge to the sheath.

7. The measuring rake according to claim 6, further comprising at least one counter-plate arranged on a rear face of the sheath situated opposite the front face, said counter-plate being provided, over its length, with a plurality of through-holes for the passage of the fixing elements from the inside of the sheath, said fixing elements passing through at least the counter-plate, the sheath, the seal and the electronic circuit to reach the patched leading edge so as to fix said patched leading edge to the sheath.

8. The measuring rake according to claim 1, further comprising at least one data processing unit configured to receive data measured by the sensors of the electronic circuit, said data processing unit being integrated in the sheath or separate.

9. An engine for an aircraft, comprising:
a secondary duct,
at least one movable reverser door, said reverser door comprising at least one link rod fixed in articulated fashion between the reverser door and a motor, said link rod being configured to make it possible to bring the reverser door into a retracted position, in which the reverser door is not across the secondary duct, and into a deployed position, in which the reverser door is across the secondary duct, and
at least one measuring rake according to claim 1, arranged on at least one link rod of the engine, said at least one link rod each being accommodated in the recess of at least one measuring rake.

10. An aircraft comprising at least one engine according to claim 9.

11. A measuring rake configured to be arranged on a link rod, comprising:
a sheath comprising a front face and two side walls which between them delimit a recess intended for receiving the link rod;
an electronic circuit arranged on the front face of the sheath and comprising at least one sensor;
a patched leading edge fixed removably to the sheath, said patched leading edge comprising an inner face arranged on the front face of the sheath so as to cover the electronic circuit, an outer face situated opposite said inner face, and a plurality of air intakes distributed over a length of the patched leading edge, each of said air intakes forming a fluidic passage between the outer face and the inner face of the patched leading edge opening out onto the electronic circuit via said inner face, facing at least one sensor of the electronic circuit;
at least one fixing element for fixing the patched leading edge to the sheath; and,
at least one counter-plate arranged on a rear face of the sheath situated opposite the front face, said counter-plate being provided, over its length, with a plurality of through-holes for the passage of the fixing elements from the inside of the sheath, said fixing elements passing through at least the counter-plate, the sheath, the seal and the electronic circuit to reach the patched leading edge so as to fix said patched leading edge to the sheath.

* * * * *